(12) United States Patent
Nahum (10) Patent No.: US 9,778,072 B1
(45) Date of Patent: Oct. 3, 2017

(54) ABSOLUTE ELECTROMAGNETIC POSITION ENCODER

(71) Applicant: Mitutoyo Corporation, Kanagawa-ken (JP)

(72) Inventor: Michael Nahum, Kirkland, WA (US)

(73) Assignee: Mitutoyo Corporation, Kanagawa-ken (JP)

( * ) Notice: Subject to any disclaimer, the term of this patent is extended or adjusted under 35 U.S.C. 154(b) by 0 days.

(21) Appl. No.: 15/070,881

(22) Filed: Mar. 15, 2016

(51) Int. Cl.
*G01B 7/14* (2006.01)
*G01D 5/20* (2006.01)
*G01D 5/245* (2006.01)

(52) U.S. Cl.
CPC ......... *G01D 5/2006* (2013.01); *G01D 5/2451* (2013.01)

(58) Field of Classification Search
CPC .................................................. G01D 5/2451
USPC .................................................. 324/207.17
See application file for complete search history.

(56) References Cited

U.S. PATENT DOCUMENTS

| 5,495,241 | A | 2/1996 | Donig et al. |
| 5,841,274 | A | 11/1998 | Masreliez et al. |
| 6,329,813 | B1 | 12/2001 | Andermo |
| 6,597,167 | B2 * | 7/2003 | Miyata ................. G01D 5/2073 257/422 |
| 7,906,958 | B2 * | 3/2011 | Nakayama ........... G01D 5/2073 324/207.15 |
| 8,350,561 | B2 * | 1/2013 | Lee ...................... G01D 5/2258 324/207.24 |
| 9,618,366 | B2 | 4/2017 | Nahum |

* cited by examiner

*Primary Examiner* — Reena Aurora
(74) *Attorney, Agent, or Firm* — Seed IP Law Group LLP (57) ABSTRACT

An absolute electromagnetic position encoder comprises a readhead and an absolute scale. The readhead comprises a spatially modulated signal coupling configuration and a readhead processor. The absolute scale comprises a passive signal pattern, an active signal pattern and a timing and activation circuit connected to the active signal pattern. During a first signal generating cycle, the readhead processor is configured to provide first cycle spatially periodic signals and the timing and activation circuit is configured to receive and store energy. During a second signal generating cycle, the timing and activation circuit is configured to drive the active signal pattern and the readhead processor is configured to provide at least one corresponding second cycle signal. The readhead processor is configured to determine an absolute position of the readhead relative to the absolute scale based on at least the second cycle signal and the first cycle spatially periodic signals.

19 Claims, 8 Drawing Sheets

*530* — During a second signal cycle, operating the timing and activation circuit to drive the first spatially modulated signal generating element to generate a corresponding spatially modulated second cycle field, such that at least one of the field generator and the field detector couples to the spatially modulated second cycle field and provides a corresponding second cycle input to the readhead processor, and operating the readhead processor to receive the second cycle input and provide at least one corresponding second cycle signal in the readhead that exhibits a unique relationship with the spatially periodic signals and is indicative of a unique position within the first absolute range.

*540* — Determine an absolute position of the readhead relative to the absolute scale based on at least the second cycle signal and the first cycle spatially periodic signals.

ABSOLUTE ELECTROMAGNETIC POSITION ENCODER

BACKGROUND

Technical Field

The present disclosure relates generally to precision metrology and, more particularly, to linear and rotary absolute electromagnetic position encoders.

Description of the Related Art

Position encoders (more particularly, induced current encoders) typically have a readhead that is movable relative to a scale member, and includes one or more transducers comprising a field generator (e.g., an excitation winding) and a field detector (e.g., receiver winding(s)). Typical absolute position encoders employ multiple parallel scale tracks juxtaposed with parallel sets of field generators and field detectors in the readhead to determine an absolute position.

U.S. Pat. No. 6,329,813, which is commonly assigned and hereby incorporated herein by reference in its entirety, discloses an absolute position encoder transducer employing multiple parallel scale tracks for determining an absolute position. While the '813 patent provides a high accuracy configuration, in some applications it is desirable to provide an absolute position encoder transducer which employs a more compact single scale track and a readhead comprising a set composed of a field detector and a field generator to determine an absolute position while further providing stronger position signals, a larger gap between the scale track and readhead, and/or lower power consumption.

BRIEF SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

An absolute electromagnetic position encoder is provided. The absolute electromagnetic position encoder comprises a readhead, and an absolute scale extending along a measuring axis of the position encoder. The readhead comprises a spatially modulated signal coupling configuration, which includes a field generator and a field detector, and a readhead processor configured to provide a first signal generating cycle and a second signal generating cycle. The readhead is movable relative to the absolute scale along the measuring axis. The absolute scale comprises a passive signal pattern comprising a periodic pattern of signal modulating elements distributed periodically at a first wavelength along the measuring axis and configured to modulate a field coupling between the field generator and the field detector to generate spatially periodic signals in the field detector as a function of readhead position relative to the absolute scale along the measuring axis, and an active signal pattern comprising at least a first spatially modulated signal generating element configured to generate a corresponding spatially modulated field that couples to the readhead to provide at least one corresponding signal in the readhead that exhibits a unique relationship with the spatially periodic signals for each unique readhead position relative to the absolute scale within a first absolute range that exceeds the first wavelength of the periodic pattern. The absolute scale further comprises a timing and activation circuit connected to the active signal pattern. The absolute electromagnetic position encoder comprises a first signal cycle configuration that is used to provide a first signal generating cycle wherein during the first signal generating cycle, the readhead processor is configured to energize the field generator to generate a first cycle field and generate first cycle spatially periodic signals in the field detector based on the passive signal pattern modulating the field coupling between the field generator and the field detector, and at least the first signal generating element of the active signal pattern couples to the first cycle field and provides energy to the timing and activation circuit, and the timing and activation circuit is configured to receive and store energy during the first signal cycle. The absolute electromagnetic position encoder comprises a second signal cycle configuration that is used to provide a second signal generating cycle wherein, during the second signal generating cycle, the timing and activation circuit is configured to drive the first spatially modulated signal generating element to generate a corresponding spatially modulated second cycle field, and at least one of the field generator and the field detector couples to the spatially modulated second cycle field and provides a corresponding second cycle input to the readhead processor, and during the second signal generating cycle the readhead processor is configured to receive the second cycle input and provide at least one corresponding second cycle signal in the readhead that exhibits a unique relationship with the spatially periodic signals and is indicative of a unique position within the first absolute range. The readhead processor is further configured to determine an absolute position of the readhead relative to the absolute scale based on at least the second cycle signal and the first cycle spatially periodic signals.

DETAILED DESCRIPTION

FIGS. 1A, 1B, 1C and 1D are schematic diagrams of portions or a whole of a first implementation of an absolute electromagnetic position encoder 100. The absolute electromagnetic position encoder 100 comprises a readhead 110 (shown in FIG. 1A), and an absolute scale 120 (shown in FIGS. 1B and 1C) extending along a measuring axis MA of the absolute electromagnetic position encoder 100. The readhead 110 comprises a spatially modulated signal coupling configuration 111 comprising a field generator 112 and a field detector 113, and a readhead processor 114 configured to provide a first signal generating cycle and a second signal generating cycle. The readhead 110 is movable relative to the absolute scale 120 along the measuring axis MA. The absolute scale 120 comprises a passive signal pattern 130 (shown in FIG. 1B) comprising a periodic pattern of signal modulating elements 131 distributed periodically at a first wavelength $\lambda_1$ along the measuring axis MA and configured to modulate a field coupling between the field generator 112 and the field detector 113 to generate spatially periodic signals in the field detector 113 as a function of a readhead position X relative to the absolute scale 120 along the measuring axis MA, and an active signal pattern 140 (shown in FIG. 1C) comprising a first spatially modulated signal generating element 141 and a second spatially modulated signal generating element 142. The first spatially modulated signal generating element 141 is configured to generate a corresponding spatially modulated field that couples to the readhead 110 to provide at least one corresponding signal in the readhead 110 that exhibits a unique relationship with the spatially periodic signals for each unique readhead position X relative to the absolute scale 120 within a first absolute range AR1 that exceeds the first wavelength $\lambda_1$ of the periodic pattern of signal modulating elements 131. The second spatially modulated signal generating element 142 is configured to generate a corresponding spatially modulated field that couples to the readhead 110 to provide a unique corresponding signal in the readhead 110 for each unique readhead position X relative to the absolute scale within an absolute range AR including the first absolute range AR1. The absolute scale 120 further comprises a timing and activation circuit 143 connected to the active signal pattern 140.

Figures 1A, 1B:
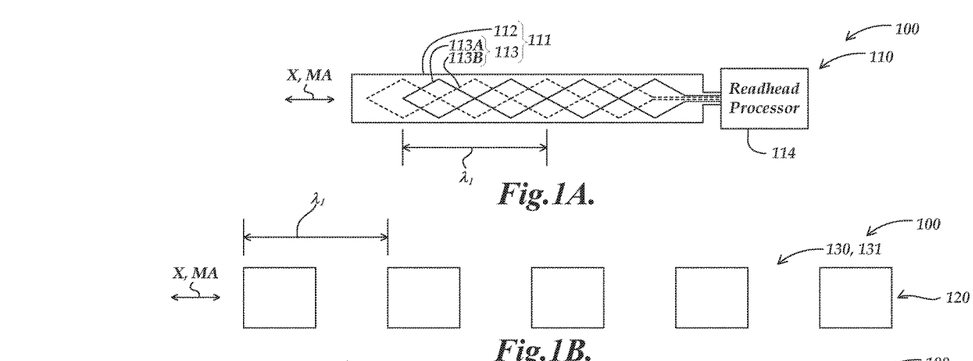
FIGS. 1A, 1B, 1C and 1D are schematic diagrams of portions or a whole of a first implementation of an absolute electromagnetic position encoder.
Figure 1C:
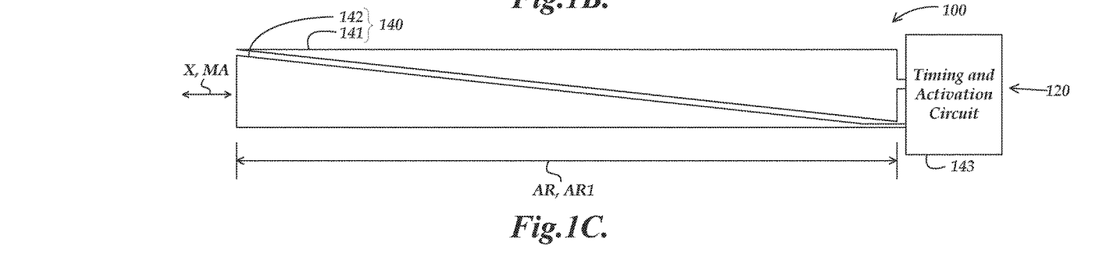

The passive signal pattern 130 and the active signal pattern 140 may be arranged along a single track in a stacked configuration such that the readhead 110 may receive signals from both.

The absolute electromagnetic position encoder 100 comprises a first signal cycle configuration that is used to provide a first signal generating cycle wherein, during the first signal generating cycle the readhead processor 114 is configured to energize the field generator 112 to generate a first cycle field and generate first cycle spatially periodic signals in the field detector 113 based on the passive signal pattern 130 modulating the field coupling between the field generator 112 and the field detector 113. At least the first signal generating element 141 (and in some implementations, the second spatially modulated signal generating element 142) of the active signal pattern 140 couples to the first cycle field and provides energy to the timing and activation circuit 143. The timing and activation circuit 143 is configured to receive and store energy during the first signal cycle.

The absolute electromagnetic position encoder 100 comprises a second signal cycle configuration that is used to provide a second signal generating cycle wherein, during the second signal generating cycle, the timing and activation circuit 143 is configured to drive the first spatially modulated signal generating element 141 to generate a corresponding spatially modulated second cycle field, and at least one of the field generator 112 and the field detector 113 couples to the spatially modulated second cycle field and provides a corresponding second cycle input to the readhead processor 114, and during the second signal generating cycle the readhead processor 114 is configured to receive the second cycle input and provide at least one corresponding second cycle signal in the readhead 110 that exhibits a unique relationship with the spatially periodic signals and is indicative of a unique position within the first absolute range AR1.

The absolute electromagnetic position encoder 100 comprises a third signal cycle configuration that is used to provide a third signal generating cycle wherein, during the third signal generating cycle, the timing and activation circuit 143 is configured to drive the second spatially modulated signal generating element 142 to generate a corresponding spatially modulated third cycle field. At least one of the field generator 112 and the field detector 113 couples to the spatially modulated third cycle field and provides a corresponding third cycle input to the readhead processor 114. During the third signal generating cycle the readhead processor 114 is configured to receive the third cycle input and provide a corresponding third cycle signal indicative of a unique position within the absolute range AR including the first absolute range AR1.

The readhead processor 114 is further configured to determine an absolute position X of the readhead 110 relative to the absolute scale 120 based on at least the second cycle signal, the third cycle signal and the first cycle spatially periodic signals.

Figure 1D:
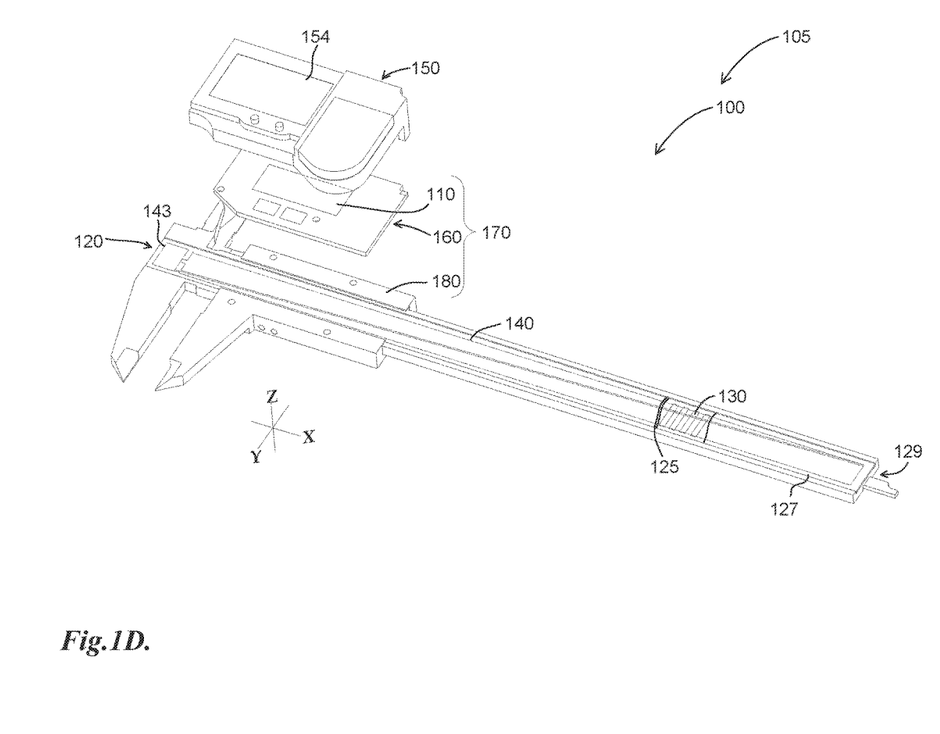

FIG. 1D shows an exploded isometric view diagram of a hand tool type caliper 105 which incorporates the absolute electromagnetic position encoder 100. In this example, the caliper 105 comprises a slider assembly 170 and a scale substrate 125 including the absolute scale 120 (a cut-away segment including the passive signal pattern 130 is illustrated) positioned in a groove 127 along an elongated scale member 129. The active signal pattern 140 and the timing and activation circuit 143 are shown. The slider assembly 170 includes an electronic assembly 160 attached to a slider 180. The readhead 110 is included in the electronic assembly 160. A measured dimension may be displayed on a digital display 154, which is mounted within a cover 150 of the electronic assembly 160 of the caliper 105. The electronic assembly 160 may include a circuit board mounted to abut the top surfaces of the slider 180 on either side of the scale member 129. It should be appreciated that the caliper 105 is an example of a measurement tool which may utilize the absolute electromagnetic position encoder 100, but the absolute electromagnetic position encoder 100 may be used in other measurement tools to provide similar measurement operations.

The absolute electromagnetic position encoder 100 or a similar encoder configured according to the principles disclosed herein may provide the advantage of a more compact single scale track absolute scale configuration, stronger position signals, a larger gap between the absolute scale and readhead, and/or lower power consumption.

It should be appreciated that while the active signal pattern 140 comprises the first spatially modulated signal generating element 141 and the second spatially modulated signal generating element 142, an absolute electromagnetic position encoder may be constructed according to the principles disclosed herein with only one spatially modulated signal generating element (e.g., the first spatially modulated signal generating element 141).

In some implementations, the readhead processor 114 may be configured to determine a value A for the second cycle signal and a value B for the third cycle signal and the readhead processor 114 may be configured to determine a processed signal (A−B)/(A+B) which is indicative of a unique position in the first absolute range.

In some implementations, generating the second cycle periodic signal may be initiated after generating the first cycle periodic signals and generating the third cycle periodic signal may be initiated after generating the first cycle periodic signals.

In some implementations such as that shown in FIG. 1B, the first spatially modulated signal generating element 141 and the second spatially modulated signal generating element 142 have substantially the same shape, but the shape of one is flipped relative to the other about the measuring axis MA and an axis perpendicular to the measuring axis MA.

In some implementations, during the second signal generating cycle, the field generator 112 may couple to the spatially modulated second cycle field and provide a corresponding second cycle input to the readhead processor 114. In some implementations, during the third signal generating cycle, the field generator 112 may couple to the spatially modulated third cycle field and provide a corresponding third cycle input to the readhead processor 114. In alternative implementations, during the second signal generating cycle, the field detector 113 may couple to the spatially modulated second cycle field and provide a corresponding second cycle input to the readhead processor 114. In some implementations, during the third signal generating cycle, the field detector 113 may couple to the spatially modulated third cycle field and provide a corresponding third cycle input to the readhead processor 114.

In some implementations, the passive signal pattern 130 and the active signal pattern 140 may be constructed on different scale layers and may be superimposed in the same scale track along the measuring axis direction MA.

In some implementations, the signal modulating elements of the periodic pattern of signal modulating elements 131 may be conductive loops which modulate the field coupling between the field generator 112 and the field detector 113.

In some implementations, the signal modulating elements of the periodic pattern of signal modulating elements 131 may be plates of material which modulate the field coupling between the field generator 112 and the field detector 113.

In some implementations, the field detector 113 may comprise a plurality of detectors arranged to generate spatially periodic signals in quadrature. For example, in FIG. 1, the field detector 113 is shown to comprise a first set of windings 113A indicated by solid lines which is configured to sense spatially periodic signals at spatial phases corresponding to 0 and 180 degrees, and a second set of windings 113B indicated by dashed lines which is configured to sense spatially periodic signals at spatial phases corresponding to 90 and 270 degrees. In other implementations, the field detector 113 may comprise a plurality of detectors arranged to generate three spatially periodic signals corresponding to spatial phase corresponding to 0, 120, and 240 degrees.

In some implementations, such as that shown in FIG. 1B, the effective width of the first spatially modulated signal generating element 141 may vary linearly as a function of position along the measuring axis direction MA. As shown in FIG. 1B, the effective width of the second spatially modulated signal generating element 142 also varies linearly as a function of position along the measuring axis direction MA.

Figure 2:
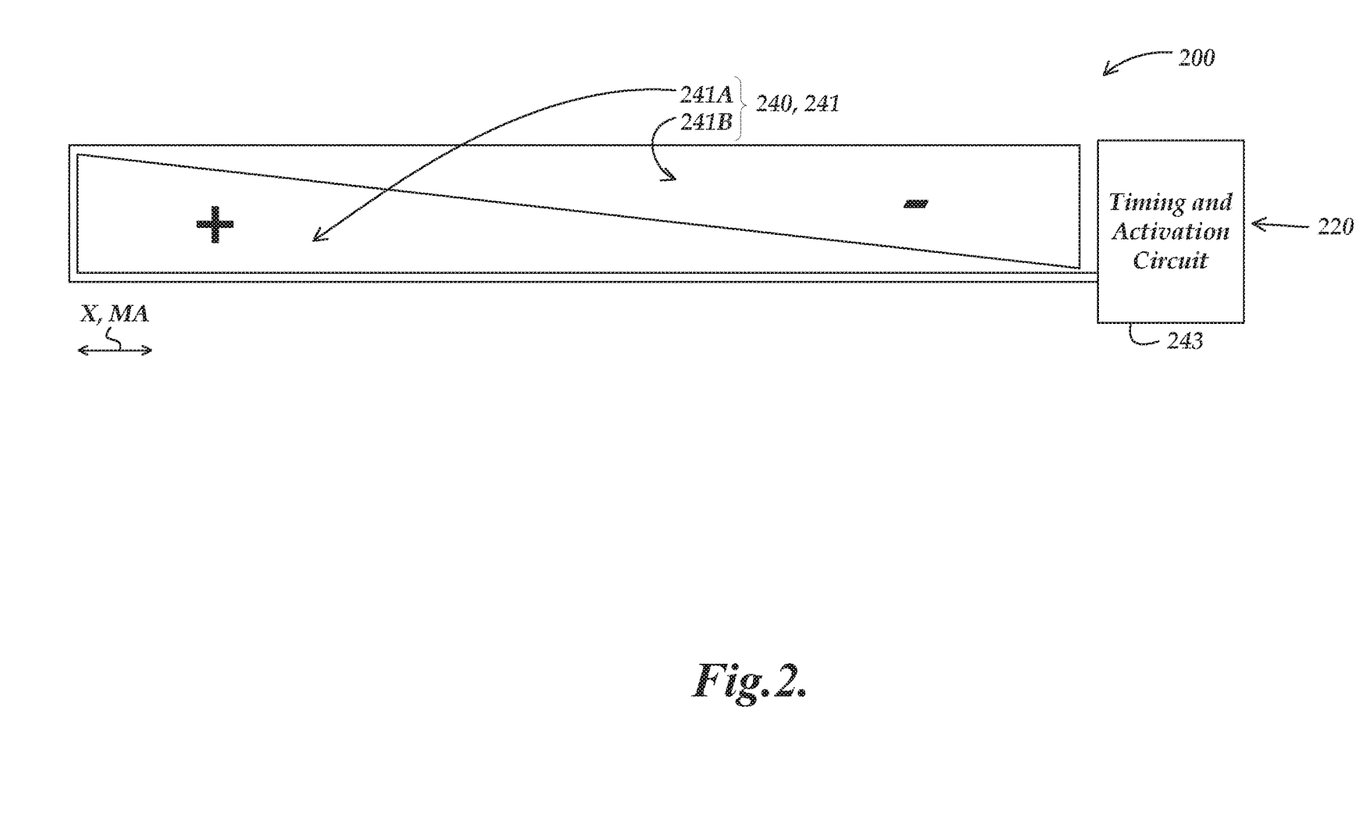
FIG. 2 is a schematic diagram of a portion of a second implementation of an absolute electromagnetic position encoder.

FIG. 2 is a schematic diagram of a portion of a second implementation of an absolute electromagnetic position encoder 200. As shown in FIG. 2, the absolute electromagnetic position encoder 200 comprises an absolute scale 220 which comprises an active signal pattern 240 comprising a spatially modulated signal generating element 241 which may be used in place of the spatially modulated signal generating element 141 in an absolute electromagnetic position encoder which is similar to the absolute electromagnetic position encoder 100. The active signal pattern 240 also comprises a timing and activation circuit 243. The spatially modulated signal generating element 241 comprises a first winding portion 241A having a first winding polarity (indicated by the "+" sign), and a second winding portion 241B having the opposite winding polarity (indicated by the "−" sign). The first winding portion 241A and the second winding portion 241B are connected to one another and are connected to the timing and activation circuit 243 by the same leads.

The absolute electromagnetic position encoder 200 comprises a second signal cycle configuration as described above with respect to FIG. 1. The active signal pattern 240 is configured such that during a second signal generating cycle, the timing and activation circuit 243 is configured to drive the spatially modulated signal generating element 241 (more specifically both the first winding portion 241A and the second winding portion 241B) to generate a corresponding spatially modulated second cycle field, and at least one of a field generator (e.g., the field generator 112), a field detector (e.g., the field detector 113), or a readhead (e.g., the readhead 110) couples to the spatially modulated second cycle field and provides a corresponding second cycle input to a readhead processor (e.g., the readhead processor 114), and during the second signal generating cycle the readhead processor is configured to receive the second cycle input and provide at least one corresponding second cycle signal in the readhead that exhibits a unique relationship with the spatially periodic signals and is indicative of a unique position within a first absolute range. For various positions of a readhead along the measuring axis MA, the second cycle signal is a differential signal as a function of the readhead position X. More specifically, a field detector will simultaneously couple to individual field contributions from the first winding portion 241A and the second winding portion 241B which have opposite polarities and provide a combined spatially modulated second cycle field which is a difference between the magnitudes of each of the individual field contributions.

Figure 3:
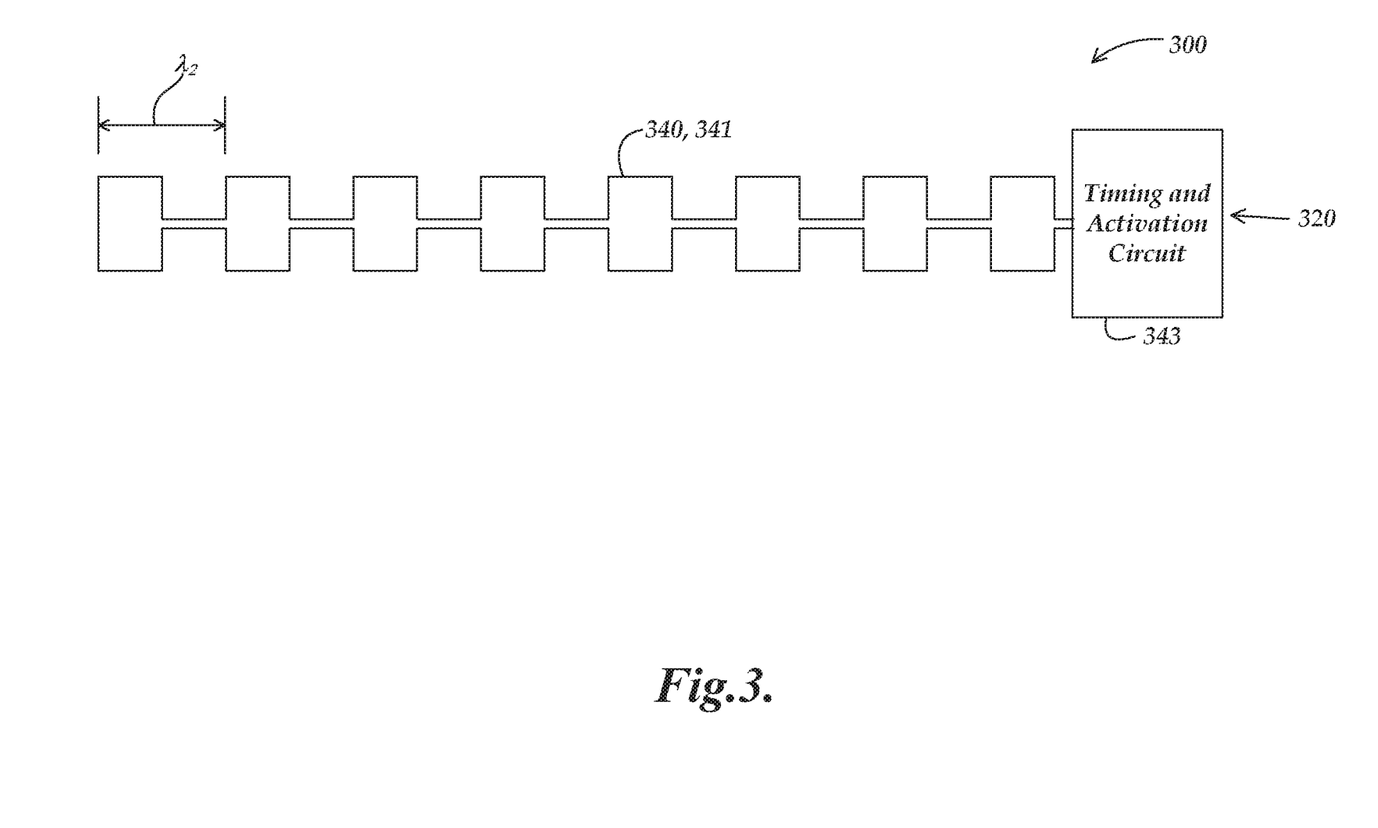
FIG. 3 is a schematic diagram of a third implementation of an absolute electromagnetic position encoder.

FIG. 3 is a schematic diagram of a third implementation of an absolute electromagnetic position encoder 300. As shown in FIG. 3, the absolute electromagnetic position encoder 300 comprises an absolute scale 320 which comprises an active signal pattern 340 comprising a spatially modulated signal generating element 341 which may be used in place of the spatially modulated signal generating element 141 in the absolute electromagnetic position encoder 300, which is otherwise similar or identical to the absolute electromagnetic position encoder 100. The active signal pattern 340 also comprises a timing and activation circuit 343.

The spatially modulated signal generating element 341 comprises a periodic array of loops, distributed periodically at a second wavelength $\lambda_2$ arranged from a single winding coupled to the timing and activation circuit 343. Like the absolute electromagnetic position encoder 100, the absolute electromagnetic position encoder 300 comprises a second signal cycle configuration that is used to provide a second signal generating cycle. During the second signal generating cycle, the timing and activation circuit 343 is configured to drive the spatially modulated signal generating element 341 to generate a corresponding spatially modulated second cycle field, and at least one of a field generator or a field detector of a readhead (e.g., the readhead 110) couples to the spatially modulated second cycle field and provides a corresponding second cycle input to a readhead processor (e.g., the readhead processor 114), and during the second signal generating cycle the readhead processor is configured to receive the second cycle input and provide at least one corresponding second cycle signal in the readhead that exhibits a unique relationship with the spatially periodic signals and is indicative of a unique position within the first absolute range. In the absolute electromagnetic encoder 100, the active signal pattern 140 is configured to provide a second cycle signal and a third cycle signal which each vary approximately linearly with a position X along the measuring axis direction. In contrast, the active signal pattern 340 is configured to provide a second cycle signal which varies periodically according to the second wavelength $\lambda_2$. This second cycle signal exhibits a unique relationship with the spatially periodic signals of a passive signal pattern (e.g., the passive signal pattern 130). For a passive signal pattern with a wavelength $\lambda_1$, a phase difference between the spatially periodic signals and the second cycle signal may vary according to an envelope with a synthetic wavelength $\lambda_{syn}$. The value of the synthetic wavelength $\lambda_{syn}$ may be given by the expression:

$$\lambda_{syn} = \frac{\lambda_1 \lambda_2}{|\lambda_2 - \lambda_1|} \quad (1)$$

The phase difference between the spatially periodic signals and the second cycle signal may be used in conjunction with the synthetic wavelength $\lambda_{syn}$ to determine an absolute position within a first absolute range which is less than or equal to the synthetic wavelength $\lambda_{syn}$.

Figure 4:
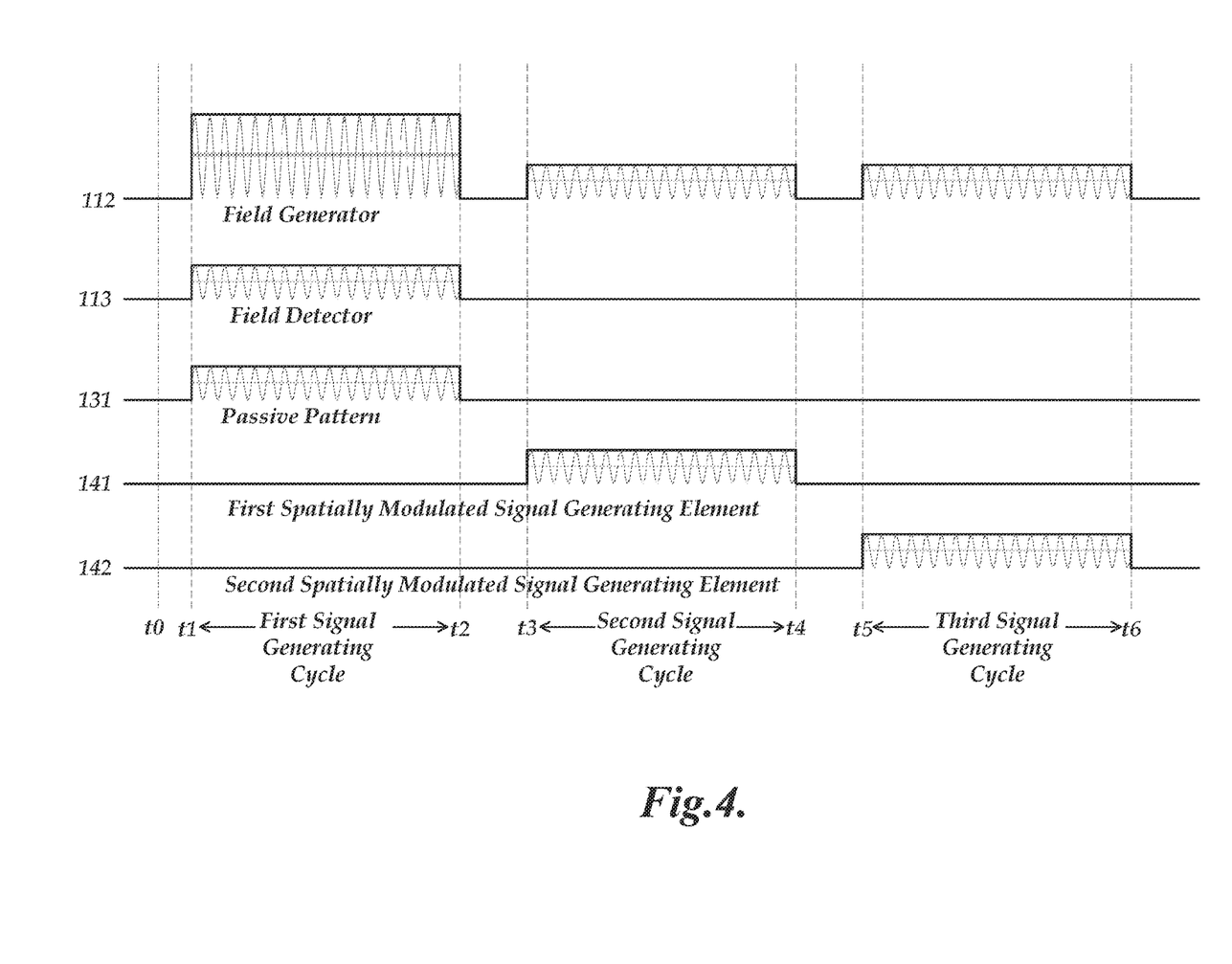
FIG. 4 is a timing diagram showing operations of the absolute electromagnetic position encoder of FIGS. 1A, 1B, 1C and 1D.

FIG. 4 is a timing diagram 400 showing operations of the absolute electromagnetic position encoder 100.

At a time t0, a first signal generating cycle begins. The readhead processor 114 energizes the field generator 112 to generate a first cycle field and generate first cycle spatially periodic signals in the field detector 113 based on the periodic pattern of signal modulating elements 131 of the passive signal pattern 130 modulating the field coupling between the field generator 112 and the field detector 113. The first spatially modulated signal generating element 141 and the second spatially modulated signal generating element 142 are inactive. The first spatially modulated signal generating element 141 (and in some implementations, the second spatially modulated signal generating element 142) of the active signal pattern 140 couple to the first cycle field and provide energy to the timing and activation circuit 143 which is configured to receive and store energy during the first signal cycle. In some implementations, the energy provided to the timing and activation circuit 143 near the time t1 may provide a reference time point to the timing and activation circuit 143 to synchronize operations with the readhead processor 114. At a time t2, the first signal generating cycle ends.

At a time t3, a second signal generating cycle begins. The timing and activation circuit 143 is configured to drive the first spatially modulated signal generating element 141 to generate a corresponding spatially modulated second cycle field, and the field generator 112 couples to the spatially modulated second cycle field and provides a corresponding second cycle input to the readhead processor 114 which is configured to receive the second cycle input and provide at least one corresponding second cycle signal in the readhead 110 that exhibits a unique relationship with the spatially periodic signals and is indicative of a unique position within the first absolute range AR1. At a time t4, the second signal generating cycle ends.

At a time t5, a third signal generating cycle begins. The timing and activation circuit 143 is configured to drive the second spatially modulated signal generating element 142 to generate a corresponding spatially modulated third cycle field, and the field generator 112 couples to the spatially modulated third cycle field and provides a corresponding third cycle input to the readhead processor 114 which is configured to receive the third cycle input and provide at least one corresponding third cycle signal in the readhead 110 that exhibits a unique relationship with the spatially periodic signals and is indicative of a unique position within the first absolute range AR1. At a time t6, the third signal generating cycle ends.

It should be appreciated that in the implementation shown in FIG. 4, during the second and third signal generating cycles, the field generator 112 couples to the spatially modulated second cycle field and provides a corresponding second cycle input to the readhead processor 114. However, in alternative implementations, during the second and third signal generating cycles, the field detector 113 may couple to the spatially modulated second cycle field and provide a corresponding second cycle input to the readhead processor 114.

Figure 5A:
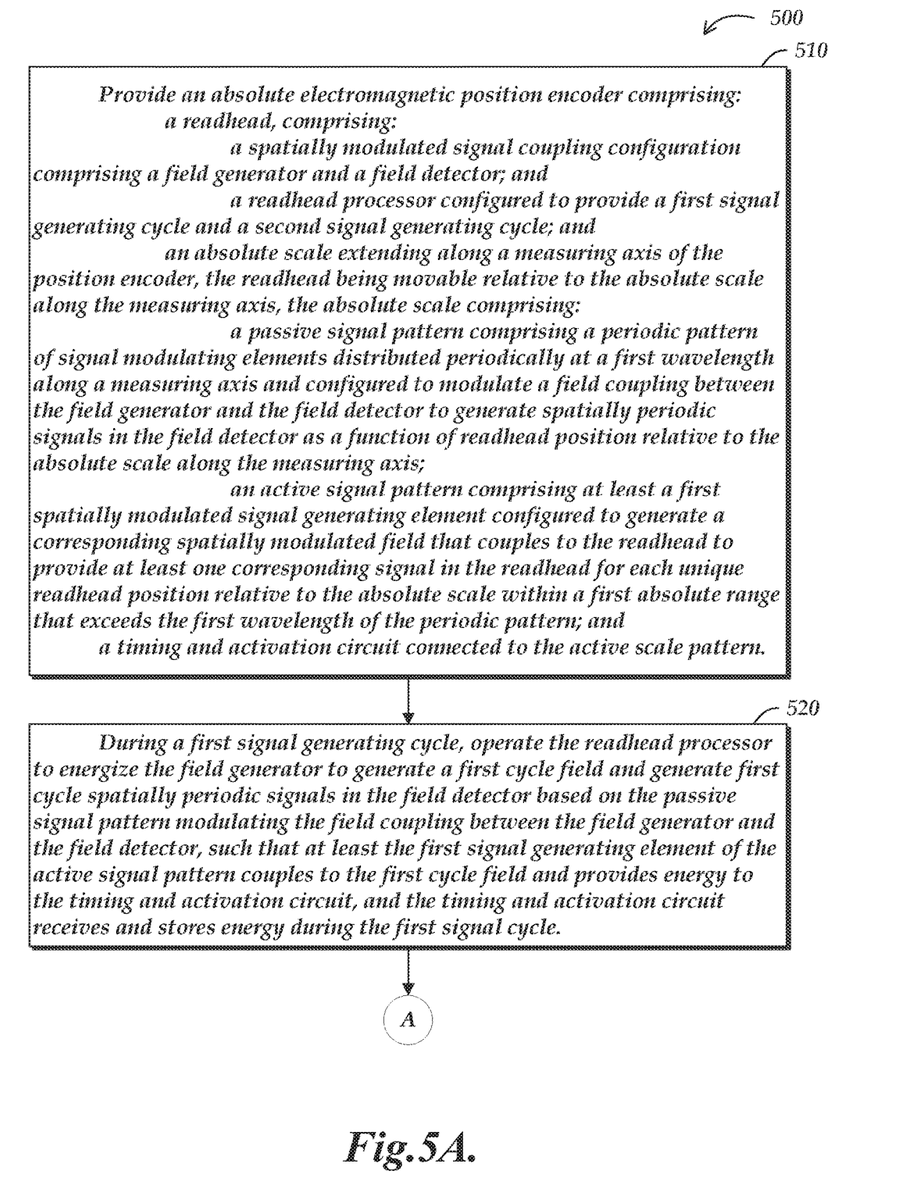
FIGS. 5A and 5B show a flow diagram illustrating one exemplary implementation of a routine for operating an absolute electromagnetic position encoder.
Figure 5B:
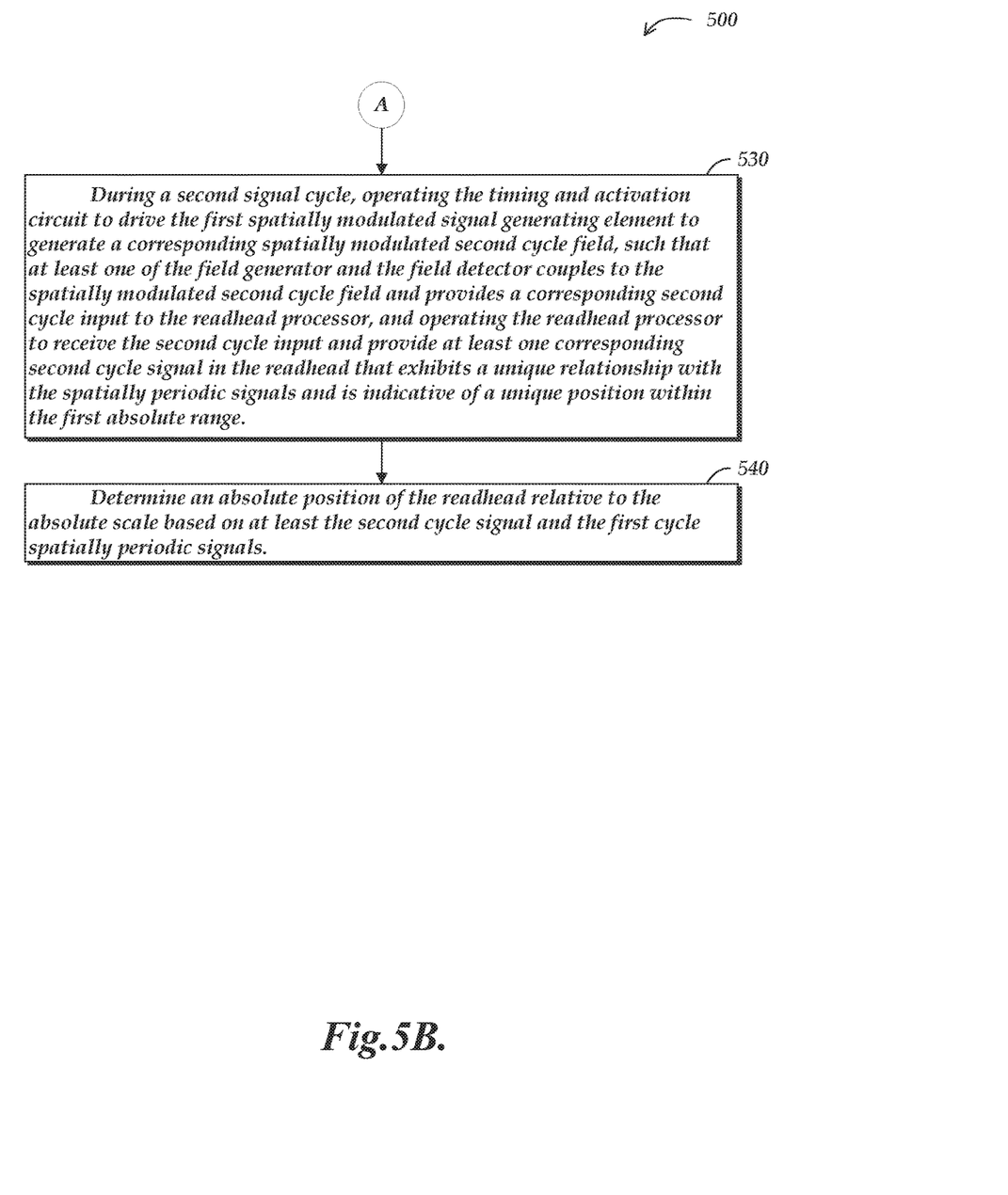

FIGS. 5A and 5B show a flow diagram 500 illustrating one exemplary implementation of a routine for operating an absolute electromagnetic position encoder.

At block 510, an absolute electromagnetic position encoder is provided. The absolute electromagnetic position encoder comprises a readhead and an absolute scale extending along a measuring axis of the position encoder. The readhead comprises a spatially modulated signal coupling configuration comprising a field generator and a field detector and a readhead processor configured to provide a first signal generating cycle and a second signal generating cycle. The readhead is movable relative to the absolute scale along the measuring axis. The absolute scale comprises a passive signal pattern comprising a periodic pattern of signal modulating elements distributed periodically at a first wavelength along a measuring axis and configured to modulate a field coupling between the field generator and the field detector to generate spatially periodic signals in the field detector as a function of readhead position relative to the absolute scale along the measuring axis, an active signal pattern comprising at least a first spatially modulated signal generating element configured to generate a corresponding spatially modulated field that couples to the readhead to provide at least one corresponding signal in the readhead for each unique readhead position relative to the absolute scale within a first absolute range that exceeds the first wavelength of the periodic pattern, and a timing and activation circuit connected to the active signal pattern.

At block 520, during a first signal generating cycle, the readhead processor is operated to energize the field generator to generate a first cycle field and generate first cycle spatially periodic signals in the field detector based on the passive signal pattern modulating the field coupling between the field generator and the field detector, such that at least the first signal generating element of the active signal pattern couples to the first cycle field and provides energy to the timing and activation circuit, and the timing and activation circuit receives and stores energy during the first signal cycle.

After block 520, the routine continues to block A which continues in FIG. 5B.

As shown in FIG. 5B, the routine continues from block A to block 530. At block 530, during a second signal cycle, the timing and activation circuit is operated to drive the first spatially modulated signal generating element to generate a corresponding spatially modulated second cycle field, such that at least one of the field generator and the field detector couples to the spatially modulated second cycle field and provides a corresponding second cycle input to the readhead processor, and the readhead processor is operated to receive the second cycle input and provide at least one corresponding second cycle signal in the readhead that exhibits a unique relationship with the spatially periodic signals and is indicative of a unique position within the first absolute range.

At block 540, an absolute position of the readhead 110 is determined relative to the absolute scale 120 based on at least the second cycle signal and the first cycle spatially periodic signals.

Figures 6A, 6B:
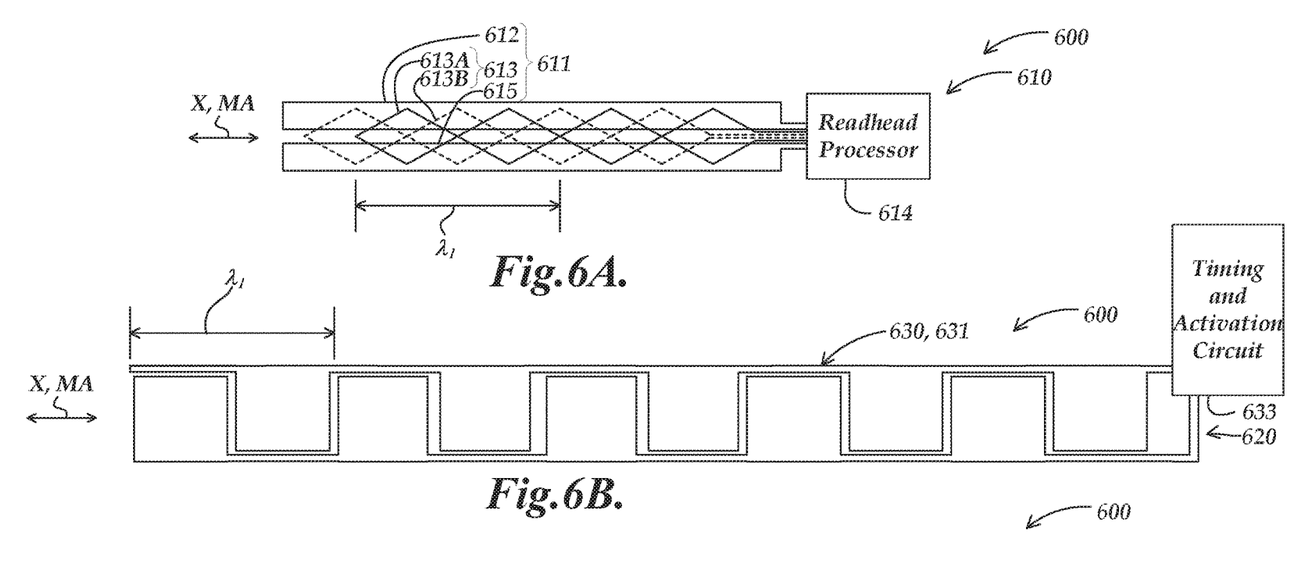
FIGS. 6A, 6B and 6C are schematic diagrams of portions of a fourth implementation of an absolute electromagnetic position encoder.
Figure 6C:
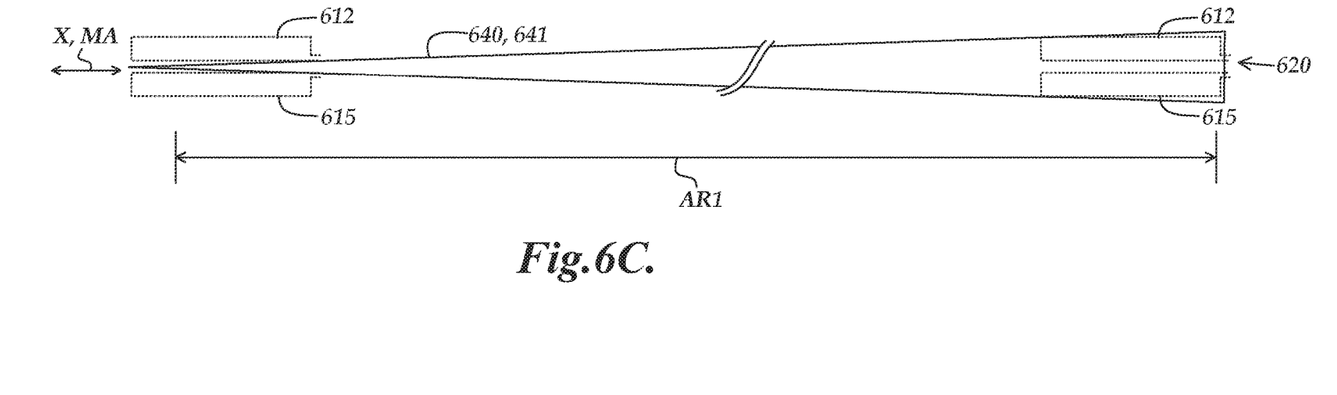

FIGS. 6A, 6B and 6C are schematic diagrams of portions of a fourth implementation of an absolute electromagnetic position encoder 600. The absolute electromagnetic position encoder 600 comprises a readhead 610 (shown in FIG. 6A), and an absolute scale 620 (shown in FIGS. 6B and 6C) extending along a measuring axis MA of the absolute electromagnetic position encoder 600. The readhead 610 comprises a spatially modulated signal coupling configuration 611 comprising a field generator 612, a periodic field detector 613, an absolute field detector 615, and a readhead processor 614 configured to provide a first signal generating cycle and a second signal generating cycle. The readhead 610 is movable relative to the absolute scale 620 along the measuring axis MA. The absolute scale 620 comprises an active signal pattern 630 (shown in FIG. 1B) comprising a periodic pattern of signal modulating elements 631 distributed periodically at a first wavelength $\lambda_1$ along the measuring axis MA and configured to generate a spatially periodic field that couples to the periodic field detector 613 to generate spatially periodic signals in the periodic field detector 613 as a function of readhead position relative to the absolute scale 620 along the measuring axis MA, and a passive signal pattern 640 comprising a spatially modulated signal generating element 641 configured to modulate a field coupling between the field generator 612 and the absolute field detector 615 to provide at least one corresponding signal in the readhead 610 that exhibits a unique relationship with the spatially periodic signals for each unique readhead position relative to the absolute scale 620 within a first absolute range AR1 that exceeds the first wavelength $\lambda_1$ of the periodic pattern of signal modulating elements 631. The absolute scale 620 further comprises a timing and activation circuit 633 connected to the active signal pattern 630.

The field detector 613 is shown to comprise a first set of windings 613A and a second set of windings 613B.

It should be appreciated that while the active signal pattern 630 is constructed from just two windings, individual instances of the periodic pattern of signal modulating elements 631 are formed as periodic rectangular portions of each of the two windings.

The active signal pattern 630 and the passive signal pattern 640 may be arranged along a single track in a stacked configuration such that the readhead 610 may receive signals from both.

The absolute electromagnetic position encoder 600 comprises a first signal cycle configuration that is used to provide a first signal generating cycle wherein, during the first signal generating cycle, the readhead processor 614 is configured to energize the field generator 612 to generate a first cycle field and generate a first cycle signal in the absolute field detector 615 based on the passive signal pattern modulating the field coupling between the field generator 612 and the absolute field detector 615, and the signal generating elements of the active signal pattern 630 couple to the first cycle field and provide energy to the timing and activation circuit 633, and the timing and activation circuit 633 is configured to receive and store energy during the first signal cycle.

The absolute electromagnetic position encoder 600 comprises a second signal cycle configuration that is used to provide a second signal generating cycle wherein, during the second signal generating cycle, the timing and activation circuit 633 is configured to drive the periodic pattern of signal generating elements 631 to generate a corresponding spatially periodic second cycle field, and the periodic field detector couples to the spatially periodic second cycle field and provides corresponding spatially periodic signals to the readhead processor 614.

The readhead processor 614 is further configured to determine an absolute position of the readhead 610 relative to the absolute scale 620 based on at least the first cycle signal and the spatially periodic signals.

While preferred implementations of the present disclosure have been illustrated and described, numerous variations in the illustrated and described arrangements of features and sequences of operations will be apparent to one skilled in the art based on this disclosure. Various alternative forms may be used to implement the principles disclosed herein. In addition, the various implementations described above can be combined to provide further implementations. All of the U.S. patents and U.S. patent applications referred to in this specification are incorporated herein by reference, in their entirety. Aspects of the implementations can be modified, if necessary to employ concepts of the various patents and applications to provide yet further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled.

The embodiments of the invention in which an exclusive property or privilege is claimed are defined as follows:

1. An absolute electromagnetic position encoder, comprising:
   a readhead, comprising:
      a spatially modulated signal coupling configuration comprising a field generator and a field detector; and
      a readhead processor configured to provide a first signal generating cycle and a second signal generating cycle; and
   an absolute scale extending along a measuring axis of the position encoder, the readhead being movable relative to the absolute scale along the measuring axis, the absolute scale comprising:
      a passive signal pattern comprising a periodic pattern of signal modulating elements distributed periodically at a first wavelength along the measuring axis and configured to modulate a field coupling between the field generator and the field detector to generate spatially periodic signals in the field detector as a function of readhead position relative to the absolute scale along the measuring axis; and
      an active signal pattern comprising at least a first spatially modulated signal generating element configured to generate a corresponding spatially modulated field that couples to the readhead to provide at least one corresponding signal in the readhead that exhibits a unique relationship with the spatially periodic signals for each unique readhead position relative to the absolute scale within a first absolute range that exceeds the first wavelength of the periodic pattern, wherein:

the absolute scale further comprises a timing and activation circuit connected to the active signal pattern;

the absolute electromagnetic position encoder comprises a first signal cycle configuration that is used to provide a first signal generating cycle wherein, during the first signal generating cycle, the readhead processor is configured to energize the field generator to generate a first cycle field and generate first cycle spatially periodic signals in the field detector based on the passive signal pattern modulating the field coupling between the field generator and the field detector, and at least the first signal generating element of the active signal pattern couples to the first cycle field and provides energy to the timing and activation circuit, and the timing and activation circuit is configured to receive and store energy during the first signal cycle;

the absolute electromagnetic position encoder comprises a second signal cycle configuration that is used to provide a second signal generating cycle wherein, during the second signal generating cycle, the timing and activation circuit is configured to drive the first spatially modulated signal generating element to generate a corresponding spatially modulated second cycle field, and at least one of the field generator and the field detector couples to the spatially modulated second cycle field and provides a corresponding second cycle input to the readhead processor, and during the second signal generating cycle the readhead processor is configured to receive the second cycle input and provide at least one corresponding second cycle signal in the readhead that exhibits a unique relationship with the first cycle spatially periodic signals and is indicative of a unique position within the first absolute range; and the readhead processor is further configured to determine an absolute position of the readhead relative to the absolute scale based on at least the second cycle signal and the first cycle spatially periodic signals.

2. The absolute electromagnetic position encoder of claim 1, wherein:

the active signal pattern comprises a second spatially modulated signal generating element configured to generate a corresponding spatially modulated field that couples to the readhead to provide at least one corresponding signal in the readhead that exhibits a unique relationship with the spatially periodic signals for each unique readhead position relative to the absolute scale within an absolute range including the first absolute range; and the absolute electromagnetic position encoder comprises a third signal cycle configuration that is used to provide a third signal generating cycle wherein, during the third signal generating cycle, the timing and activation circuit is configured to drive the second spatially modulated signal generating element to generate a corresponding spatially modulated third cycle field, and at least one of the field generator and the field detector couples to the spatially modulated third cycle field and provides a corresponding third cycle input to the readhead processor, and during the third signal generating cycle the readhead processor is configured to receive the third cycle input and provide at least one corresponding third cycle signal in the readhead that exhibits a unique relationship with the spatially periodic signals and is indicative of a unique position within the absolute range including the first absolute range; and the readhead processor is further configured to determine an absolute position of the readhead relative to the absolute scale based on at least the second cycle signal, the third cycle signal and the first cycle spatially periodic signals.

3. The absolute electromagnetic position encoder of claim 2, wherein:

the readhead processor is configured to determine a value A for the second cycle signal and a value B for the third cycle signal; and the readhead processor is configured to determine a processed signal $(A-B)/(A+B)$ which is indicative of a unique position in the first absolute range.

4. The absolute electromagnetic position encoder of claim 2, wherein:

generating the second cycle periodic signal is initiated after generating the first cycle periodic signals; and generating the third cycle periodic signal is initiated after generating the first cycle periodic signals.

5. The absolute electromagnetic position encoder of claim 2, wherein the first spatially modulated signal generating element and the second spatially modulated signal generating element have substantially the same shape, but the shape of one is flipped relative to the other about the measuring axis and an axis perpendicular to the measuring axis.

6. The absolute electromagnetic position encoder of claim 2, wherein:

during the second signal generating cycle, the field generator couples to the spatially modulated second cycle field and provides a corresponding second cycle input to the readhead processor; and during the third signal generating cycle, the field generator couples to the spatially modulated third cycle field and provides a corresponding third cycle input to the readhead processor.

7. The absolute electromagnetic position encoder of claim 2, wherein:

during the second signal generating cycle, the field detector couples to the spatially modulated second cycle field and provides a corresponding second cycle input to the readhead processor; and during the third signal generating cycle, the field detector couples to the spatially modulated third cycle field and provides a corresponding third cycle input to the readhead processor.

8. The absolute electromagnetic position encoder of claim 1, wherein generating the second cycle periodic signal is initiated after generating the first cycle periodic signals.

9. The absolute electromagnetic position encoder of claim 1, wherein during the second signal generating cycle, the field generator couples to the spatially modulated second cycle field and provides a corresponding second cycle input to the readhead processor.

10. The absolute electromagnetic position encoder of claim 1, wherein during the second signal generating cycle, the field detector couples to the spatially modulated second cycle field and provides a corresponding second cycle input to the readhead processor.

11. The absolute electromagnetic position encoder of claim 1, wherein the passive signal pattern and the active signal pattern are constructed on different scale layers and are superimposed in the same scale track along the measuring axis direction.

12. The absolute electromagnetic position encoder of claim 1, wherein the signal modulating elements of the periodic pattern of signal modulating elements are conductive loops which modulate the field coupling between the field generator and the field detector.

13. The absolute electromagnetic position encoder of claim 1, wherein the signal modulating elements of the periodic pattern of signal modulating elements are plates of material which modulate the field coupling between the field generator and the field detector.

14. The absolute electromagnetic position encoder of claim 1, wherein the field detector comprises a plurality of detectors arranged to generate spatially periodic signals in quadrature.

15. The absolute electromagnetic position encoder of claim 1, wherein the field detector comprises a plurality of detectors arranged to generate three spatially periodic signals corresponding to spatial phases corresponding to 0, 120, and 240 degrees.

16. The absolute electromagnetic position encoder of claim 1, wherein the second spatially modulated signal generating element comprises a first winding portion having a first winding polarity, and a second winding portion having the opposite winding polarity.

17. The absolute electromagnetic position encoder of claim 1, wherein the effective width of the first spatially modulated signal generating element varies linearly as a function of position along the measuring axis direction.

18. An absolute electromagnetic position encoder, comprising:
　a readhead, comprising:
　　a spatially modulated signal coupling configuration comprising a field generator, a periodic field detector and an absolute field detector; and
　　a readhead processor configured to provide a first signal generating cycle and a second signal generating cycle; and
　an absolute scale extending along a measuring axis of the position encoder, the readhead being movable relative to the absolute scale along the measuring axis, the absolute scale comprising:
　　an active signal pattern comprising a periodic pattern of signal generating elements distributed periodically at a first wavelength along the measuring axis and configured to generate a spatially periodic field that couples to the periodic field detector to generate spatially periodic signals in the periodic field detector as a function of readhead position relative to the absolute scale along the measuring axis; and
　　a passive signal pattern comprising a spatially modulated signal generating element configured to modulate a field coupling between the field generator and the absolute field detector to provide at least one corresponding signal in the readhead that exhibits a unique relationship with the spatially periodic signals for each unique readhead position relative to the absolute scale within a first absolute range that exceeds the first wavelength of the periodic pattern, wherein:
　the absolute scale further comprises a timing and activation circuit connected to the active scale pattern;
　the absolute electromagnetic position encoder comprises a first signal cycle configuration that is used to provide a first signal generating cycle wherein, during the first signal generating cycle, the readhead processor is configured to energize the field generator to generate a first cycle field and generate a first cycle signal in the absolute field detector based on the passive signal pattern modulating the field coupling between the field generator and the absolute field detector, and the signal generating elements of the active signal pattern couple to the first cycle field and provide energy to the timing and activation circuit, and the timing and activation circuit is configured to receive and store energy during the first signal cycle;
　the absolute electromagnetic position encoder comprises a second signal cycle configuration that is used to provide a second signal generating cycle wherein, during the second signal generating cycle, the timing and activation circuit is configured to drive the periodic pattern of signal generating element to generate a corresponding spatially periodic second cycle field, and the periodic field detector couples to the spatially periodic second cycle field and provides corresponding spatially periodic signals to the readhead processor; and
　the readhead processor is further configured to determine an absolute position of the readhead relative to the absolute scale based on at least the first cycle signal and the spatially periodic signals.

19. A method for operating an absolute electromagnetic position encoder, the method comprising:
　providing an absolute electromagnetic position encoder comprising:
　　a readhead, comprising:
　　　a spatially modulated signal coupling configuration comprising a field generator and a field detector; and
　　　a readhead processor configured to provide a first signal generating cycle and a second signal generating cycle; and
　　an absolute scale extending along a measuring axis of the position encoder, the readhead being movable relative to the absolute scale along the measuring axis, the absolute scale comprising:
　　　a passive signal pattern comprising a periodic pattern of signal modulating elements distributed periodically at a first wavelength along a measuring axis and configured to modulate a field coupling between the field generator and the field detector to generate spatially periodic signals in the field detector as a function of readhead position relative to the absolute scale along the measuring axis;
　　　an active signal pattern comprising at least a first spatially modulated signal generating element configured to generate a corresponding spatially modulated field that couples to the readhead to provide at least one corresponding signal in the readhead for each unique readhead position relative to the absolute scale within a first absolute range that exceeds the first wavelength of the periodic pattern; and
　　　a timing and activation circuit connected to the active signal pattern;
　during a first signal generating cycle, operating the readhead processor to energize the field generator to generate a first cycle field and generate first cycle spatially periodic signals in the field detector based on the passive signal pattern modulating the field coupling between the field generator and the field detector, such that at least the first signal generating element of the active signal pattern couples to the first cycle field and provides energy to the timing and activation circuit, and the timing and activation circuit receives and stores energy during the first signal cycle;

during a second signal cycle, operating the timing and activation circuit to drive the first spatially modulated signal generating element to generate a corresponding spatially modulated second cycle field, such that at least one of the field generator and the field detector couples to the spatially modulated second cycle field and provides a corresponding second cycle input to the readhead processor, and operating the readhead processor to receive the second cycle input and provide at least one corresponding second cycle signal in the readhead that exhibits a unique relationship with the spatially periodic signals and is indicative of a unique position within the first absolute range; and determining an absolute position of the readhead relative to the absolute scale based on at least the second cycle signal and the first cycle spatially periodic signals.

* * * * *